E. M. SCOVILLE.
VALVE.
APPLICATION FILED SEPT. 6, 1917.
Reissued Jan. 22, 1918. 14,423.
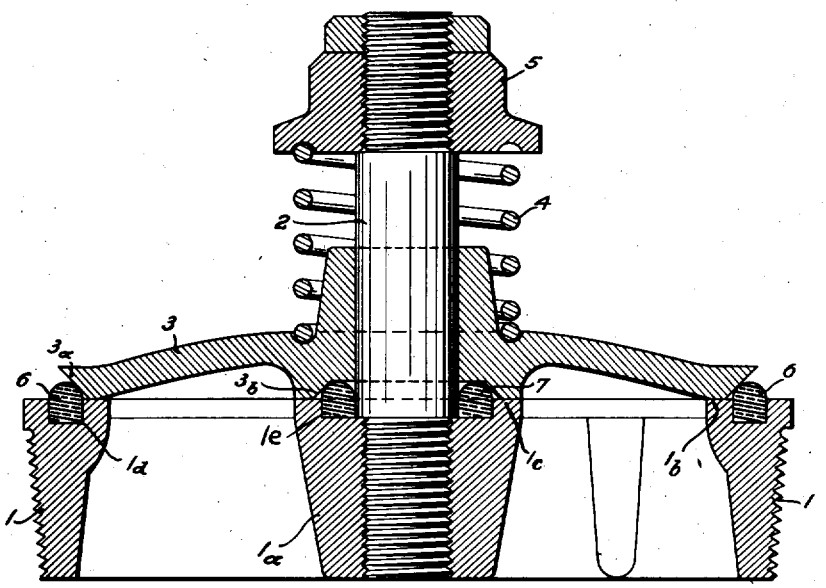
Inventor
E. M. Scoville
by G. J. Dillon
Attorney

UNITED STATES PATENT OFFICE.

EUGENE M. SCOVILLE, OF DADE CITY, FLORIDA, ASSIGNOR TO SCOVILLE PUMP VALVE COMPANY, OF CHICAGO, ILLINOIS, A CORPORATION OF ILLINOIS.

VALVE.

14,423. Specification of Reissued Letters Patent. Reissued Jan. 22, 1918.

Original No. 1,161,257, dated November 23, 1915, Serial No. 879,138, filed December 26, 1914. Application for reissue filed September 6, 1917. Serial No. 190,690.

*To all whom it may concern:*

Be it known that I, EUGENE M. SCOVILLE, a citizen of the United States, formerly residing at Waipahu, county of Honolulu, Territory of Hawaii, but now residing at Dade City, Florida, have invented certain new and useful Improvements in Valves; and I do hereby declare the following to be a full, clear, and exact description of the invention, such as will enable others skilled in the art to which it appertains to make and use the same.

This invention relates to improvements in valves, and is particularly applicable to pump valves.

The ideal valve, especially for high pressure pumps, is unquestionably one which seats metal to metal, provided that it can be kept tight with a minimum of trouble and expense.

Valves which depend for their tightness upon a set of compressible or elastic material in conjunction with a pressure exerted upon the valve proper to force it to a tight contact with the compressible or yielding seat, are necessarily short lived, and particularly so when working under high pressures and at high speeds.

Valves in which a flexible material, such as leather, is attached to the valve proper, for the purpose of sealing the valve, are objectionable, for the upward flow of the fluid discharged through the valve is more or less obstructed thereby and the life of such material is short.

The present invention contemplates a valve which seats metal to metal and is not dependent upon the pressure on the valve proper for its tightness and effectiveness. It is provided with a ring or rings of easily compressible or yielding material, such as soft rubber, for example, inserted in a groove or grooves in the valve casing contiguous to the seat or seats whereby the ring or rings are retained by the valve casing. The edge or edges of the valve proper are beveled and come in fairly close contact with the ring or rings, when the valve is seated. The groove or grooves provide a circular recess or recesses extending parallel to the valve axis making it easy to insert the ring or rings therein. If there is any tendency to leak, due for example to an imperfect fit or a damaged seat, the action of the fluid in attempting to escape through the same forces the ring into the V-shaped groove, formed by the junction of the beveled edge of the valve with the top of the casing adjacent to the seat, and thereby seals the joint. The beveling of the valve also gives the advantage of offering less obstruction to the upward flow of the fluid when leaving the valve. This is of considerable importance, especially so when the valves are set closely together. With the ordinary type of valve the fluid is deflected by the valve itself and is discharged against the fluid discharged from the adjacent valves, which causes the formation of objectionable eddies and impedes the upward flow of the fluid.

The invention comprises, therefore, a valve having a metal casing, a metal valve slidable on a stud or stem in the casing, a spring adapted to force the valve toward the casing, said valve adapted to seat on the casing metal to metal, and having a beveled edge and a ring of compressible or yielding material in a groove in the casing adjacent to and surrounding the seat to provide a stubby packing portion in the form of a cantaliver projecting therefrom, and adapted to be forced by the pressure of the fluid against the beveled edge of the valve when the fluid attempts to escape through the joint between the valve and the seat and thereby seal the joint. In its broadest aspect, the invention is as hereinafter claimed. To prevent a leak between the valve and the stem, the valve may also seat against the casing metal to metal around the stem and be beveled adjacent to the stem, and a ring of compressible or yielding material be inserted in a groove in the casing surrounding the stem adapted to be forced against the beveled edge of the valve by the pressure of the escaping fluid and thus seal the joint contiguous to the stem.

When the valve is not in operation, it is possible to insert a piece of paper between the beveled edge of the valve and the ring. As the valve thus seats metal to metal on the body or casing and not on the compressible or yielding ring or rings, the beveled edge or edges of the valve proper only coming in fairly close contact with the ring or rings, there is very little wear on the latter, and in case of renewal they are easily and cheaply replaced. Valves of the construction contemplated are, therefore, not dependent upon the pressure on the valve proper for their tightness and effectiveness.

The accompanying drawing, forming a part of this specification, is a sectional view through the middle of a pump valve embodying a preferred form of my invention.

Referring to the drawing, 1 represents the body or casing of the valve, which is externally threaded for screwing into the body or barrel of the pump. The stud or stem 2 is screwed into the central hub $1^a$ of the casing 1. The valve proper 3 is slidable on the stem 2 and seats metal to metal on the seat $1^b$ of the casing 1 and also on the seat $1^c$ of the hub $1^a$. The spring 4, interposed between the valve 3 and the nut 5 on the stem 2 forces the valve 3 toward the casing 1. The valve 3 is beveled at its outer edge $3^a$ and also at its inner edge $3^b$ near the stem 2 as shown. The ring 6, of soft rubber or other compressible or yielding material, is inserted in and projects from the valve casing 1 to provide a stubby packing portion in the form of a cantaliver, above the groove $1^d$ adjacent to the seat $1^b$ and surrounding the same. The ring 7 is similarly inserted in the groove $1^e$ in the hub $1^a$ of the casing 1 and surrounds the stem 2, as shown.

In practice, valves of this construction, having four rings each, have been in continuous operation in a Riedler pump for several months working night and day against a pressure of two hundred and twenty-five pounds per square inch, opening on an average of sixty times per minute, and are absolutely tight and efficient.

It is obvious that the construction could be reversed from that described by beveling the casing instead of the valve and inserting the ring in a groove in the valve instead of in the casing, but such an arrangement is not desirable, one reason being that the discharge upward of the fluid is obstructed due primarily to its being deflected downward, thereby setting up counter currents and eddies with a consequent loss in friction and necessity to increase the lift of the valve, and due secondarily to the increased size of the valve proper which is necessary in order to provide the groove for the ring.

I claim:

1. A valve comprising two parts, a valve seat and a valve adapted to seat directly on said seat, and a ring of soft yielding material retained by one of said parts to provide a stubby packing portion in the form of a cantaliver projecting from said part and adapted to be forced against an adjacent surface of the other of said parts by the pressure of the fluid in opposition to the cantaliver when the fluid attempts to escape by the valve but so positioned that it will not be displaced by said other part.

2. A valve comprising two parts, a valve seat and a puppet type of valve adapted to seat directly on said seat, one of said parts having a circular recess formed therein and extending generally parallel to the valve axis, and a ring of soft yielding material retained within and projecting from said recess to provide a stubby packing portion in the form of a cantaliver and adapted to be forced against an adjacent surface of said other of said parts by the pressure of the fluid in opposition to the cantaliver when the fluid attempts to escape by the valve but so positioned that it will not be displaced by said other part.

3. A valve comprising two parts, a valve seat and a valve adapted to seat directly on said seat, said parts having surfaces coming into junction to form a V-shaped groove at the pressure side of the seating when the valve is closed, and a ring of soft yielding material retained by one of said parts to provide between said surfaces a cantaliver packing portion adapted to be forced against the other of said parts by the pressure of the fluid in opposition to the cantaliver when the fluid attempts to escape by the valve but so positioned that it will not be displaced by said other part.

In testimony whereof I affix my signature, in presence of two witnesses.

EUGENE M. SCOVILLE.

Witnesses:
A. G. KNIGHT,
R. A. MCMAHAN.